US006892786B2

(12) United States Patent
Messerschmidt et al.

(10) Patent No.: US 6,892,786 B2
(45) Date of Patent: May 17, 2005

(54) ASSEMBLY INCLUDING AT LEAST ONE GUIDE RAIL AND ONE SLIDE FOR A ROLL-UP SUN SCREEN IN A MOTOR VEHICLE

(75) Inventors: Martin Messerschmidt, Mainz (DE); Rainer Hattass, Grundam (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/669,880

(22) Filed: Sep. 24, 2003

(65) Prior Publication Data
US 2004/0104000 A1 Jun. 3, 2004

(30) Foreign Application Priority Data
Oct. 21, 2002 (DE) .......................................... 102 48 958

(51) Int. Cl.⁷ .............................................. E06B 9/56
(52) U.S. Cl. ................................. 160/290.1; 160/276
(58) Field of Search ............................ 160/290.1, 274, 160/275, 276, 283, 286, 289, 405

(56) References Cited

U.S. PATENT DOCUMENTS

| | | | | |
|---|---|---|---|---|
| 1,952,689 A | * | 3/1934 | Selje ........................ 160/275 |
| 3,911,992 A | * | 10/1975 | Webb ...................... 160/290.1 |
| 4,658,879 A | * | 4/1987 | Van Klompenburg ....... 160/271 |
| 4,890,354 A | * | 1/1990 | Cooper ........................ 16/87 R |
| 5,573,050 A | * | 11/1996 | Henkenjohann ............ 160/133 |
| 6,296,040 B1 | * | 10/2001 | Schaap .................... 160/290.1 |

FOREIGN PATENT DOCUMENTS

| | | |
|---|---|---|
| EP | 0409295 | 1/1991 |
| JP | 08-121057 | 5/1996 |
| JP | 09-136538 | 5/1997 |

OTHER PUBLICATIONS

Austrian Search Report Dated Dec. 19, 2002.

* cited by examiner

Primary Examiner—David Purol
(74) Attorney, Agent, or Firm—Carlson, Gaskey & Olds

(57) ABSTRACT

An assembly for a shade system of a motor vehicle, such as a roll-up shade or a sliding sunroof, includes a guide rail and a slide movable in the guide rail. The slide includes a braking element engageable in a braking groove of the guide rail to stop the slide in a desired position in the guide rail. The slide has a swivel pin and a support element acted upon by a spring and set apart from the swivel pin. The support element is supported on the guide rail so that the braking element is forced into the braking groove to stop the slide in the guide rail.

17 Claims, 4 Drawing Sheets

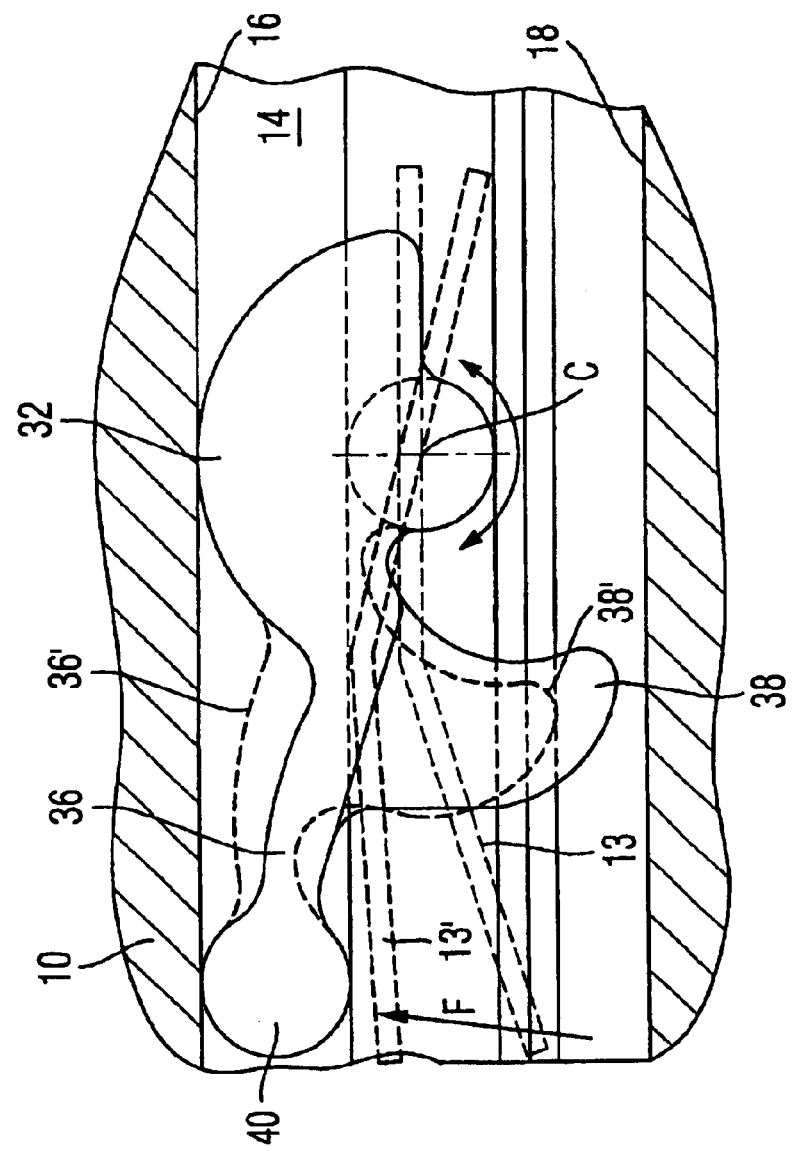

ASSEMBLY INCLUDING AT LEAST ONE GUIDE RAIL AND ONE SLIDE FOR A ROLL-UP SUN SCREEN IN A MOTOR VEHICLE

REFERENCE TO RELATED APPLICATIONS

This application claims priority to German patent application DE 102 48 958.0 filed on Oct. 21, 2002.

TECHNICAL FIELD

The present invention relates generally to an assembly including at least one guide rail and one slide moveable in the guide rail and used in a shade system, such as a roll-up shade or a sliding sunroof of a motor vehicle.

BACKGROUND OF THE INVENTION

A slide of a guide rail assembly should be easily moveable in a guide rail so that only small activating forces are required to move the roll-up shade or the sun screen forwards or backwards. However, it is necessary that the slide remains in a set or desired position in the guide rail to prevent the roll-up shade or the sun screen from moving unintentionally during vehicle motion, especially under the influence of a return spring.

SUMMARY OF THE INVENTION

The assembly of the present invention includes a slide that is moveable in a guide rail and that can be retained in a desired position. The guide rail includes at least one braking groove. The slide includes at least one braking element engageable in the braking groove to stop the slide in the guide rail. The slide has a swivel pin and a sliding segment set apart from the swivel pin. The sliding segment is under the influence of a spring supported on the guide rail that forces the braking element into the braking groove. When the roll-up shade or sun screen is moved forwards or backwards, the slide is rotated about the swivel pin, pulling the braking element out of the braking groove and allowing the slide to easily move in the guide rail. When the roll-up shade or sun screen is released, the slide is swiveled by a support element such that the braking element is pressed into the braking groove, securely stopping the roll-up shade or sun screen.

The support element can be joined to the slide by a plate spring that generates a torque about the swivel pin of the slide to press the braking element into the braking groove.

The support element and the slide may be configured as one piece and joined by an elastically flexible arm. The entire slide can be manufactured as one piece by, for example, injection molding. By appropriately selecting the geometry of the arm that joins the support element to the body of the slide, and by appropriately selecting the properties of the material of the slide, the desired spring characteristics can be generated without having to utilize an additional component.

Preferably, the guide rail has two parallel braking grooves and the slide has two braking elements that engage in the two braking grooves in fork-like fashion to further increase the braking effect of the braking elements in the guide rail. To further increase the braking effect, the two braking elements are elastically pressed apart when forced into the braking grooves.

Preferably, the swivel pin extends beyond the guide rail to allow attachment of a cross bar on the swivel pin. The forward end of the roll-up shade or the sun screen can then be attached to the cross bar. Additionally, the cross bar can be provided with a handle to manually move the roll-up shade or sun screen.

The various features and advantages of the invention will become apparent to those skilled in the art from the following detailed description of the currently preferred embodiment. The drawings that accompany the detailed description can be briefly described as follows:

BRIEF DESCRIPTION OF THE DRAWINGS

FIG. 9 depicts an alternate embodiment of the slide in the guide rail.

DETAILED DESCRIPTION OF THE PREFERRED EMBODIMENT

Figure 1:
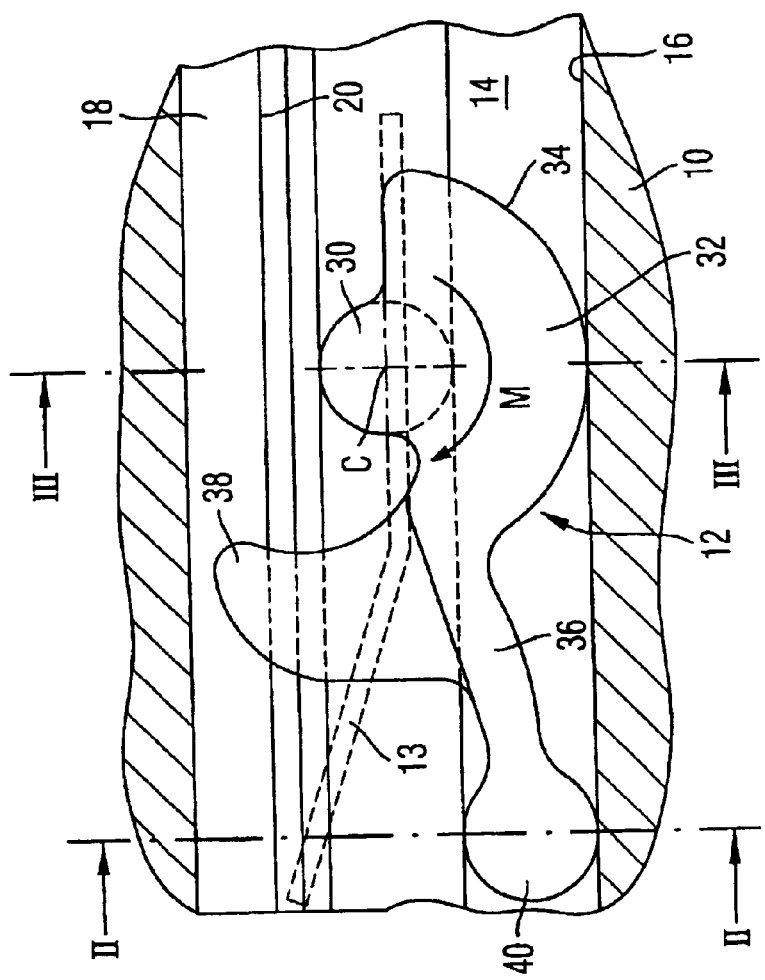
FIG. 1 depicts a schematic longitudinal section of a guide rail and a slide that is disposed in the guide rail according to one embodiment of the invention.

FIG. 1 illustrates a guide rail 10 and a slide 12 movably arranged in the guide rail 10. In one embodiment, two opposing parallel guide rails are attached to a roof of a vehicle and run roughly parallel to the longitudinal direction of the vehicle. A slide 12 is provided in each guide rail 10. That is, two slides 12 are provided opposite each other. The slides 12 are joined by a cross bar 13 running transversely with respect to the longitudinal direction of the vehicle.

A roll-up shade or sun screen connected to the cross bar 13 is arranged underneath a roof opening. The roof opening is closed by a cover of a sliding roof system. The roll-up shade is accommodated in a housing in the rear end of the vehicle and can be pulled forwards out of the housing in opposition to the force of a return spring (not shown). The cross bar 13 and both the slides 12 are fixed to the front end of the roll-up shade. The slides 12 guide the roll-up shade and stop it in a desired position in the guide rail 10, preventing the roll-up shade from unintentionally retracting into the housing by the return spring.

In one embodiment, each guide rail 10 is extruded of an aluminum alloy and has a hollow interior 14 in which the slide 12 is arranged. The hollow interior 14 is bordered on a lower side by a support surface 16, and two braking grooves 18 separated by a rib 20 are provided on the opposing upper side.

Figure 2:
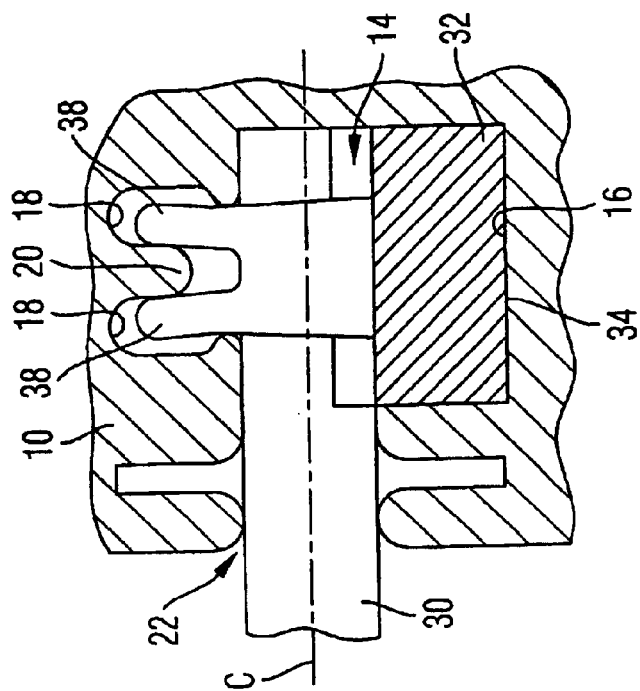
FIG. 2 depicts a cross-sectional view along plane II of FIG. 1.
Figure 3:
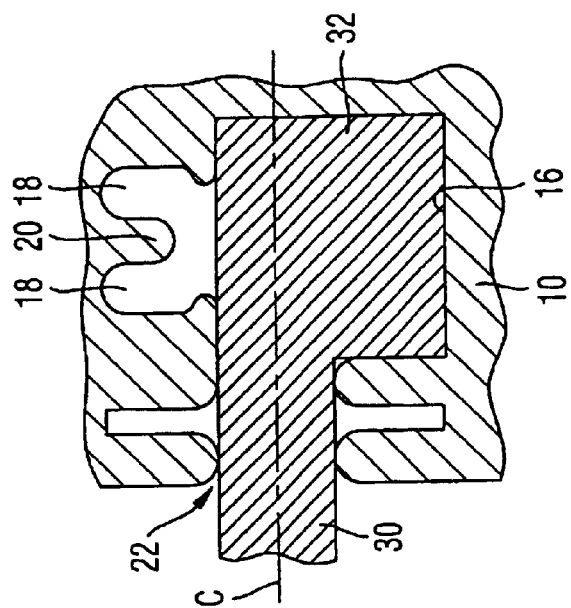
FIG. 3 depicts a cross-sectional view along plane III of FIG. 1.
Figure 8:
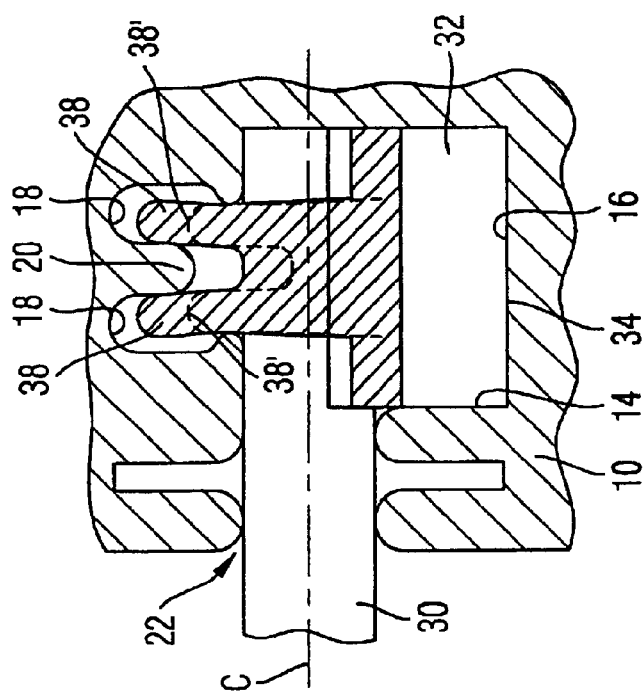
FIG. 8 depicts a cross-sectional view along plane VIII of FIG. 7.

As shown in FIGS. 2, 3 and 8, the guide rail 10 includes a through slot 22 that joins the hollow interior 14 to the exterior of guide rail 10.

Figure 6:
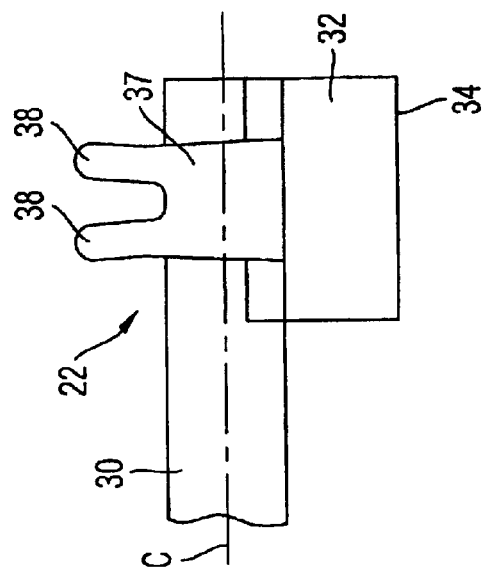
FIG. 6 depicts in a front view of the slide.
Figure 4:
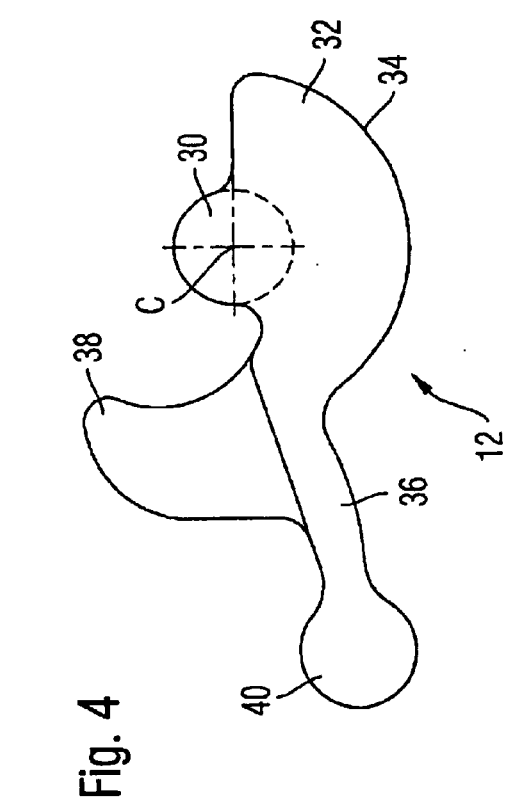
FIG. 4 depicts a side view of the slide.
Figure 5:
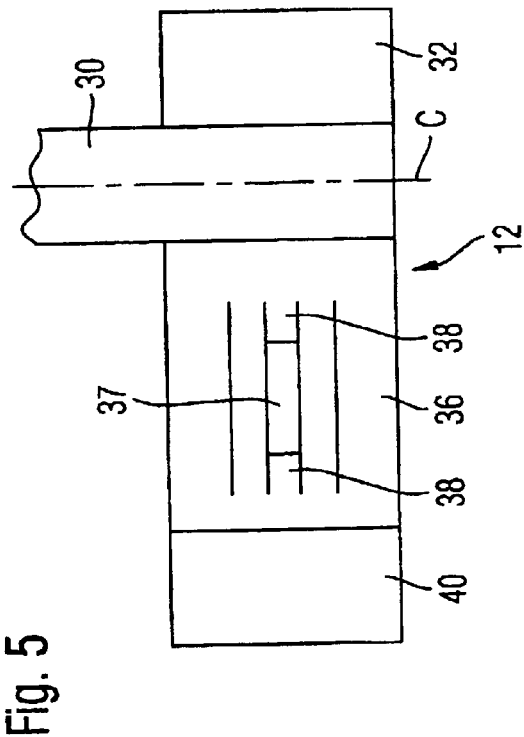
FIG. 5 depicts in a top view of the slide.

As shown in FIGS. 4, 5 and 6, the slide 12 has a swivel pin 30 extending the entire width of slide 12. The cross bar 13 is fixedly joined to the swivel pin 30. A sliding segment 32 connected to the swivel pin 30 has an exterior surface 34 concentric to the central axis C of the swivel pin 30. An elastically flexible arm 36 is integrally joined to sliding segment 32. As shown in FIGS. 5 and 6, two braking elements 38 extend from a base segment 37 on the upper side of the arm 36 and are configured next to each other as fork-shaped projections.

A cylindrical support element 40 is integrally joined to the end of the arm 36 opposite the swivel pin 30. The axis of the support element 40 runs parallel to central axis C.

The slide 12, including the arm 36, the braking elements 38, and the support element 40, is made out of plastic in one piece. Preferably, the slide 12 is extruded and made of POM (Polyoxymethylene). The slide 12 can also be injection molded. By appropriately selecting the geometry of the arm 36 that joins the support element 40 to the body of the slide 12, and by appropriately selecting the properties of the material of the slide 12, the desired spring characteristics can be generated without having to utilize an additional component.

When the slide 12 is arranged in the hollow interior 14 of the guide rail 10, the exterior surface 34 of the sliding segment 32 and the support element 40 are supported on the support surface 16 of the guide rail 10. The swivel pin 30 extends through the through-slot 22 beyond the guide rail 10. In the initial position, as shown in FIGS. 1 and 2, no external forces act upon the slide 12 and the arm 36 exerts a torque upon the slide 12 in the direction of arrow M about central the axis C of the swivel pin 30. The arm 36 pushes the support element 40 downwardly, as shown in FIG. 1. As a result of the torque exerted, both braking elements 38 are pressed into the braking grooves 18 and contact both sides of the rib 20. Both the braking elements 38 are elastically deformed to create high frictional forces that arrest the slide 12 in the guide rail 10.

Figure 7:
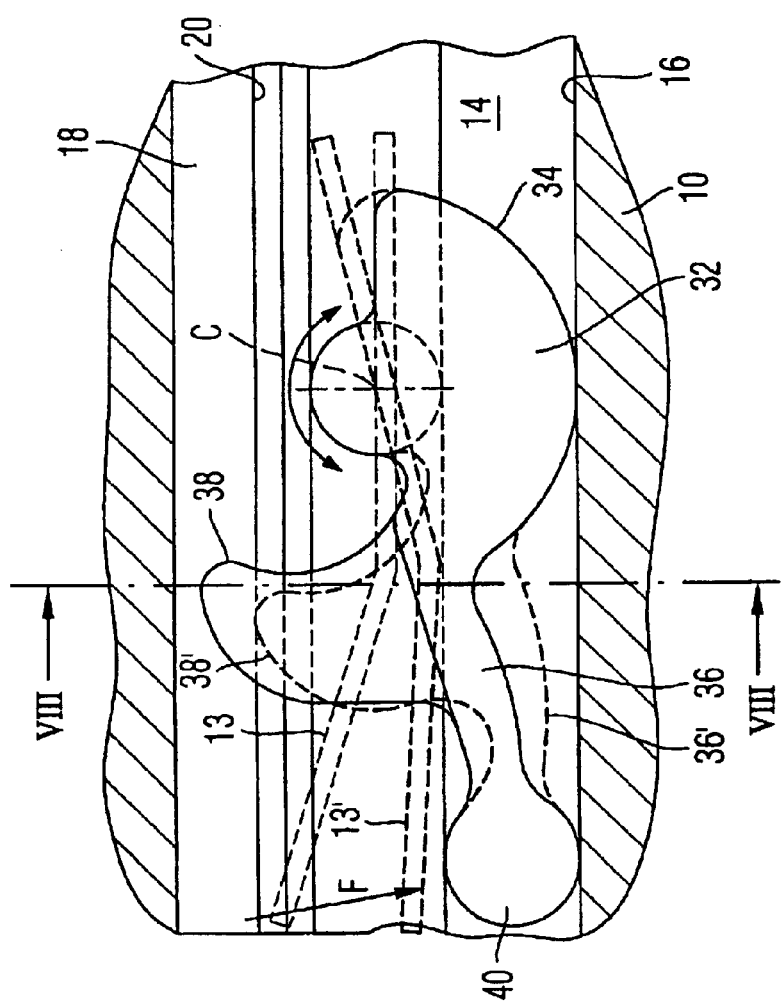
FIG. 7 depicts the slide in the guide rail in an arrested and a released state.

As shown in FIG. 7, if a user moves the cross bar 13, and therefore the roll-up shade or sun screen, the user pulls on a handle (not shown) attached to the cross bar 13 (indicated by force F), swiveling the cross bar 13 about the central axis C of the swivel pin 30 from the position indicated by the solid lines to the position indicated by the broken lines. The swivel motion is transmitted by the swivel pin 30 to the sliding segment 32, and the sliding segment 32 swivels in the counterclockwise direction in opposition to the torque acting in the direction of arrow M. Due to the swivel motion of the sliding segment 32, the right and of the arm 36 is pushed downwardly, elastically pressing the arm 36 into the position 36' (indicated by a broken line). Simultaneously, as further shown in FIG. 8, both braking elements 38 move downwardly into the position 38' (indicated as a broken line) in which the braking elements 38 do not engage in the braking grooves 18. In this position, the slide 12 can freely move in the guide rail 10 so the user can freely slide the roll-up shade or sun screen into a new position.

When the user releases the handle, and therefore the cross bar 13, the slide 12 and the cross bar 13 are swiveled by the spring action of the arm 36 into the position shown in FIG. 1 in which both the braking elements 38 engage in the braking grooves 18. As a result, the slide 12, the cross bar 13, and the attached roll-up shade or sun screen are stopped in the desired position.

FIG. 9 illustrates an alternate embodiment in which the arrangement of the support surface 16 and the braking grooves 18 is reversed. In the initial position, both the braking elements 38 are pressed downwardly into the two braking grooves 18. To release the slide 12, the cross bar 13 is pressed upwardly as indicated by arrow F. When the cross bar 13 is released, the sliding segment 32 is swiveled by the elastically biased arm 36 in the counterclockwise direction, and both the braking elements 38 engage in both the braking grooves 18. The slide 12 is then stopped in the guide rail 10 in the desired position.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An assembly comprising:
   at least one guide rail having at least one braking groove; and
   a slide movable in said guide rail, said slide having at least one braking element that is engageable with and disengageable from said at least one braking groove, a swivel pin pivotable about an axis, a sliding segment, and a support element supported on said guide rail to force said at least one braking element into said at least one braking groove.

2. The assembly as recited in claim 1, wherein said support element and said sliding segment are joined by a plate spring.

3. The assembly as recited in claim 1, wherein said support element and said slide are joined by an elastically flexible arm.

4. The assembly as recited in claim 1, wherein said at least one guide rail comprises two braking grooves, and said slide includes two braking elements which each engage in one of said two braking grooves.

5. The assembly as recited in claim 4, wherein said two braking elements are elastically pressed apart when forced into said two braking grooves.

6. The assembly as recited in claim 1, wherein said swivel pin extends outwardly from said guide rail.

7. The assembly as recited in claim 6, further including a cross bar attached to said swivel pin.

8. The assembly as recited in claim 7, further including two guide rails and two slides, and each of said two guide rails has one of said two slides, and said cross bar extends between said two slides.

9. The assembly as recited in claim 8, further including a handle attached to said cross bar.

10. The assembly as recited in claim 1, wherein said assembly is used in a shade system.

11. The assembly as recited in claim 10, wherein said shade system is one of a roll-up shade and a sliding sunroof.

12. The assembly as recited in claim 3, wherein said support element, said slide, and said arm are connected together as a single unit.

13. The assembly as recited in claim 1, wherein said slide is plastic.

14. The assembly as recited in claim 1, wherein said at least one braking element is in said at least one braking groove when the assembly is in a non-moveable position, and said at least one braking element is not in said at least one braking groove when the assembly is in a moveable position.

15. The assembly as recited in claim 14, wherein said slide pivots about said axis of said swivel pin to move said slide between said moveable position and said non-moveable position.

16. A method of moving a slide in a guide rail comprising the steps of:
- pivoting said slide in a first direction to remove at least one braking element of said slide from at least one braking groove of said guide rail;
- moving said slide in said guide rail; and
- pivoting said slide in a second direction opposite to said first direction to engage said at least one braking element of said slide from said at least one braking groove of said guide rail.

17. An assembly comprising:
- at least one guide rail having at least one braking groove; and
- at least one slide that is movable in the guide rail, the slide being associated with a shade system component for a motor vehicle, the slide having at least one braking element that can engage with the braking groove to stop the slide in the guide rail, the slide having a swivel pin and a support clement that is set apart from the swivel pin,
- wherein the support element is acted upon by a spring and is supported on the guide rail such that the braking element is forced into said at least one braking groove.

\* \* \* \* \*